(12) United States Patent
Liu (10) Patent No.: US 12,105,735 B2
(45) Date of Patent: Oct. 1, 2024

(54) ASYNCHRONOUS ACCOUNTING METHOD AND APPARATUS FOR BLOCKCHAIN, MEDIUM AND ELECTRONIC DEVICE

(71) Applicant: Tencent Technology (Shenzhen) Company Limited, Guangdong (CN)

(72) Inventor: Pan Liu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 17/974,233

(22) Filed: Oct. 26, 2022

(65) Prior Publication Data

US 2023/0052935 A1      Feb. 16, 2023

Related U.S. Application Data

(63) Continuation of application No. PCT/CN2021/130637, filed on Nov. 15, 2021.

(30) Foreign Application Priority Data

Dec. 28, 2020   (CN) .......................... 202011577543.1

(51) Int. Cl.
*G06F 16/27*      (2019.01)
*G06F 16/23*      (2019.01)

(52) U.S. Cl.
CPC ........ *G06F 16/273* (2019.01); *G06F 16/2358* (2019.01)

(58) Field of Classification Search
CPC .......................... G06F 16/273; G06F 16/2358
See application file for complete search history.

(56) References Cited

U.S. PATENT DOCUMENTS

2013/0036427 A1* 2/2013 Chen ...................... G06F 9/546
                                                           719/312
2016/0164884 A1   6/2016 Sriram et al.
(Continued)

FOREIGN PATENT DOCUMENTS

CN    108804112 A    11/2018
CN    110135178 A     8/2019
(Continued)

OTHER PUBLICATIONS

International Search Report and Written Opinion issued in International Application No. PCT/CN2021/130637, mailed Jan. 5, 2022, with English Translation, 8 pages.
(Continued)

*Primary Examiner* — Brittany N Allen
(74) *Attorney, Agent, or Firm* — ArentFox Schiff LLP (57) ABSTRACT

An asynchronous accounting method for a blockchain is provided. After a block reaches a consensus, different types of data contained in block information of the block are written into message queues corresponding to the respective types of data. Each of the message queues correspond to a different one of the types of data contained in the block information. A next round of block consensus processing is started after the different types of data are written into the message queues corresponding to the respective types of data. The different types of data are read from the message queues corresponding to the respective types of data to perform persistence processing of a blockchain ledger.

15 Claims, 3 Drawing Sheets

(56) References Cited

U.S. PATENT DOCUMENTS

2017/0132615 A1   5/2017  Castinado et al.
2018/0351732 A1*  12/2018 Wang .................. G06F 16/1805
2019/0026146 A1*  1/2019  Peffers ................. G06F 9/5044
2021/0081403 A1*  3/2021  Tian ................... G06F 16/2365

FOREIGN PATENT DOCUMENTS

CN    110659988 A     1/2020
CN    110995776 A     4/2020
CN    112291372 A     1/2021
CN    108804112 B  *  2/2022  ............... G06F 8/60

OTHER PUBLICATIONS

Extended European Search Report issued in European Application No. 21913524.1, mailed Feb. 26, 2024, 10 pages.

* cited by examiner

ASYNCHRONOUS ACCOUNTING METHOD AND APPARATUS FOR BLOCKCHAIN, MEDIUM AND ELECTRONIC DEVICE

RELATED APPLICATIONS

The present application is a continuation of International Application No. PCT/CN2021/130637, entitled "ASYNCHRONOUS BOOKKEEPING METHOD AND APPARATUS FOR BLOCKCHAIN, MEDIUM, AND ELECTRONIC DEVICE" and filed on Nov. 15, 2021, which claims priority to Chinese Patent Application No. 202011577543.1, entitled "ASYNCHRONOUS ACCOUNTING METHOD AND APPARATUS FOR BLOCKCHAIN, MEDIUM AND ELECTRONIC DEVICE" and filed on Dec. 28, 2020. The entire disclosures of the prior applications are hereby incorporated by reference in their entirety.

FIELD OF THE TECHNOLOGY

This application relates to the field of computer and communication technologies, including to asynchronous accounting of a blockchain.

BACKGROUND OF THE DISCLOSURE

After a blockchain network reaches a consensus on a block, the blockchain node needs to write block information into a ledger. Typically, a node accounting method serially writes the block information to a disk or a distributed storage. For example, a block header is first written into a disk or a distributed storage, and a transaction list and a transaction execution result set continue to be written into the disk or the distributed storage after this step is completed. After the transaction list and the transaction execution result set are written, a write set is written into the disk or the distributed storage. After the write set is written, the node accounting is completed and a next round of consensus block generation begins.

SUMMARY

Embodiments of this disclosure include an asynchronous accounting method and apparatus for a blockchain, non-transitory computer-readable storage medium and electronic device, which, at least to a certain extent, can reduce an accounting delay of a block and improve processing performance of a blockchain network.

Other features and advantages of this disclosure become obvious through the following detailed descriptions, or may be partially learned partially through the practice of this disclosure.

According to an aspect of the embodiments of this disclosure, an asynchronous accounting method for a blockchain is provided. After a block reaches a consensus, different types of data contained in block information of the block are written into message queues corresponding to the respective types of data. Each of the message queues correspond to a different one of the types of data contained in the block information. A next round of block consensus processing is started after the different types of data are written into the message queues corresponding to the respective types of data. The different types of data are read from the message queues corresponding to the respective types of data to perform persistence processing of a blockchain ledger.

According to an aspect of the embodiments of this disclosure, an asynchronous accounting apparatus that includes processing circuitry is provided. The processing circuitry is configured to write, after a block reaches a consensus, different types of data contained in block information of the block into message queues corresponding to the respective types of data. Each of the message queues corresponds to a different one of the types of data contained in the block information. The processing circuitry is configured to start a next round of block consensus processing after the different types of data are written into the message queues corresponding to the respective types of data. The processing circuitry is configured to read the different types of data from the message queues corresponding to the respective types of data to perform persistence processing of a blockchain ledger.

According to an aspect of the embodiments of this disclosure, a non-transitory computer-readable storage medium is provided. The non-transitory computer-readable storage medium stores instructions which when executed by a processor cause the processor to perform the asynchronous accounting method for a blockchain according to the foregoing embodiments.

According to an aspect of the embodiments of this disclosure, an electronic device is provided, including: one or more processors; and a storage apparatus, configured to store one or more programs, the one or more programs, when executed by the one or more processors, causing the one or more processors to implement the asynchronous accounting method for a blockchain according to the foregoing embodiments.

According to an aspect of the embodiments of this disclosure, a computer program product or a computer program is provided, the computer program product or the computer program including computer instructions, the computer instructions being stored in a computer-readable storage medium. A processor of a computer device reads the computer instructions from the computer-readable storage medium, and the processor executes the computer instructions, to cause the computer device to perform the asynchronous accounting method for a blockchain provided in the various embodiments described above.

In technical solutions provided by some embodiments of this disclosure, various pieces of data contained in block information corresponding to the consensus block are respectively written into a corresponding message queue after a block reaches a consensus. A next round of block consensus process is started after the various pieces of data are respectively written into the corresponding message queue, and then data is respectively read from the message queues corresponding to the various pieces of data to perform persistence processing of a blockchain ledger. It can be seen that, on the one hand, technical solutions of the embodiments of this disclosure reduce an accounting delay of a block by processing various pieces of data contained in the block information in parallel; on the other hand, a next round of block consensus process can be started after the data is written into the message queue without waiting for the persistence process of the various pieces of data in the block, improving the throughput of the blockchain network, thereby effectively improving the processing performance of the blockchain network.

It is to be understood that the foregoing general descriptions and the following detailed descriptions are merely for illustration and explanation purposes and are not intended to limit this disclosure.

DESCRIPTION OF EMBODIMENTS

Exemplary implementations are now described more comprehensively with reference to the accompanying drawings. However, the examples of implementations may be implemented in multiple forms, and it should not be understood as being limited to the examples of implementations described herein. Further, the implementations are provided to make this disclosure more comprehensive and complete, and convey the idea of the examples of the implementations to a person skilled in the art.

In addition, the described features, structures, or characteristics may be combined in one or more embodiments in any appropriate manner. In the following descriptions, more specific details are provided to provide a more comprehensive understanding of the embodiments of this disclosure. However, a person skilled in the art is to be aware that, technical solutions in this disclosure may be implemented without one or more of the specific details, or another method, unit, apparatus, or step may be used.

The block diagrams shown in the accompanying drawings are exemplary functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

"Plurality of" mentioned in the specification means two or more. And/or describes an association relationship for describing associated objects and represents that three relationships may exist. For example, A and/or B may represent the following three cases: only A exists, both A and B exist, and only B exists. The character "/" generally indicates an "or" relationship between the associated objects.

A blockchain is a new application mode of computer technologies such as distributed data storage, point-to-point (P2P) transmission, consensus mechanisms, and encryption algorithms. The blockchain is essentially a decentralized database and is a string of data blocks generated through association by using a cryptographic method (i.e., blocks). Each data block includes information of a batch of network transactions, the information being used for verifying the validity of information of the data block (anti-counterfeiting) and generating a next data block. The blockchain may include an underlying blockchain platform, a platform product service layer, and an application service layer.

The underlying blockchain platform may include user management, basic service, smart contract, operation monitoring, and other processing modules. A user management module is responsible for management of identity information of all blockchain participants, including maintenance of public and private key generation (account management), key management, maintenance of a corresponding relationship between a real identity of a user and a blockchain address (authority management), and so on, and in a case of being authorized, supervises and audits transaction states of some real identities, and provides rule configuration for risk control (risk control audit). A basic service module is deployed on all blockchain node devices to verify validity of a service request, and records a valid request to a storage after completing consensus. For a new service request, a basic service first performs interface adaptation parsing and authentication processing (interface adaptation), then encrypts service information through a consensus algorithm (consensus management), transmits (e.g., completely and/or consistently) the new service request to a shared ledger (network communication) after encryption, and records and stores the new service request. A smart contract module is responsible for registration and issuance of a contract, as well as contract triggering and contract execution. A developer may define contract logic through a programming language, publish the contract logic to the blockchain (contract registration), according to logic of a contract term, call a key or other events to trigger execution, complete the contract logic, and further provide functions of contract upgrade and cancellation. An operation monitoring module is mainly responsible for deployment, configuration modification, contract configuration, cloud adaptation and visual output of a real-time state of a product during product operation, for example: alarming, monitoring a network condition, monitoring node device health state, and so on.

The platform product service layer provides basic capabilities and an implementation framework of a typical application. Based on these basic capabilities, developers may superpose characteristics of services and complete blockchain implementation of service logic. The application service layer provides a blockchain solution-based application service for use by a service participant.

Figure 1:
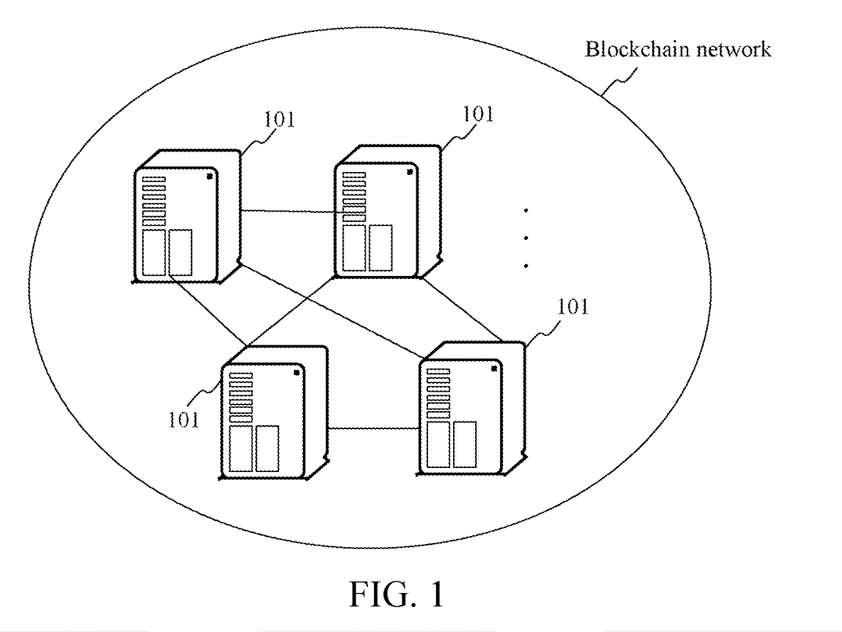
FIG. 1 is a schematic structural diagram of a blockchain network.

Referring to a blockchain network shown in FIG. 1, the blockchain network may include a plurality of nodes 101, and the plurality of nodes 101 may be various clients forming the blockchain network. Each node 101 may receive inputted information during normal operating, and maintain shared data in the blockchain network based on the received inputted information. To ensure the interchange of information in the blockchain network, there may be information connections among nodes in the blockchain network, and the nodes may transmit information through the foregoing information connections. For example, in a case that any node in the blockchain network receives inputted information, other nodes in the blockchain network obtain the inputted information according to a consensus algorithm, and store the inputted information as shared data, so that data stored in all nodes in the blockchain network is consistent.

Each node in the blockchain network has a corresponding node identifier, and each node in the blockchain network may store node identifiers of other nodes, to subsequently broadcast a generated block to other nodes in the blockchain network according to the node identifiers of other nodes. Each node may maintain a node identifier list, and store node names and node identifiers correspondingly in the node identifier list. A node identifier may be an Internet Protocol (IP, a protocol for interconnection between networks) address and any other information that can be used to identify a node.

Figure 2:
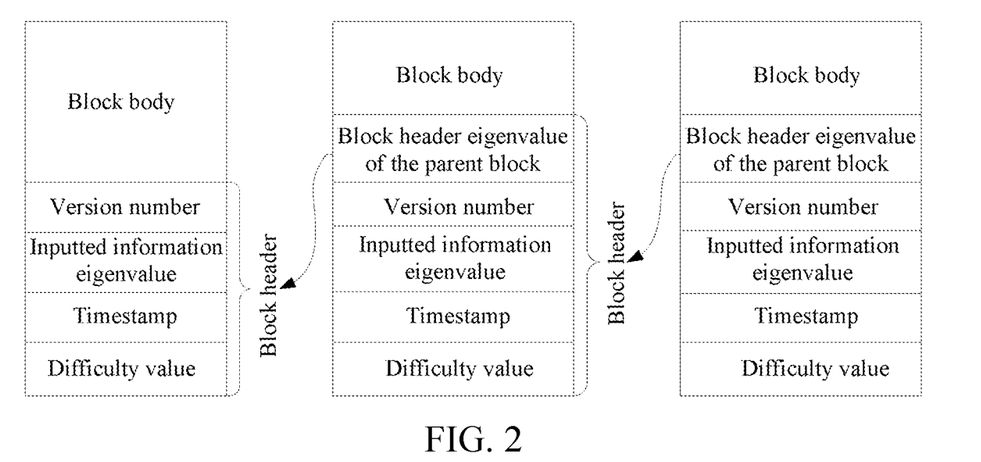
FIG. 2 is a schematic diagram of a connection relationship between blocks in a blockchain.

Each node in the blockchain network stores the same blockchain. Referring to FIG. 2, the blockchain includes a plurality of blocks, and a genesis block includes a block header and a block body. The block header may store a feature value of input information, a version number, a timestamp, and a difficulty value and the like, and the block body may store the input information. A next block of the genesis block uses the genesis block as a parent block, and the next block also includes a block header and a block body. The block header may store the inputted information eigenvalue of the current block, a block header eigenvalue of the parent block, a version number, a timestamp, and a difficulty value, and the rest may be deduced by analogy, so that block data stored in each block in the blockchain is associated with block data stored in the parent block, ensuring the security of the inputted information in the blocks.

Figure 3:
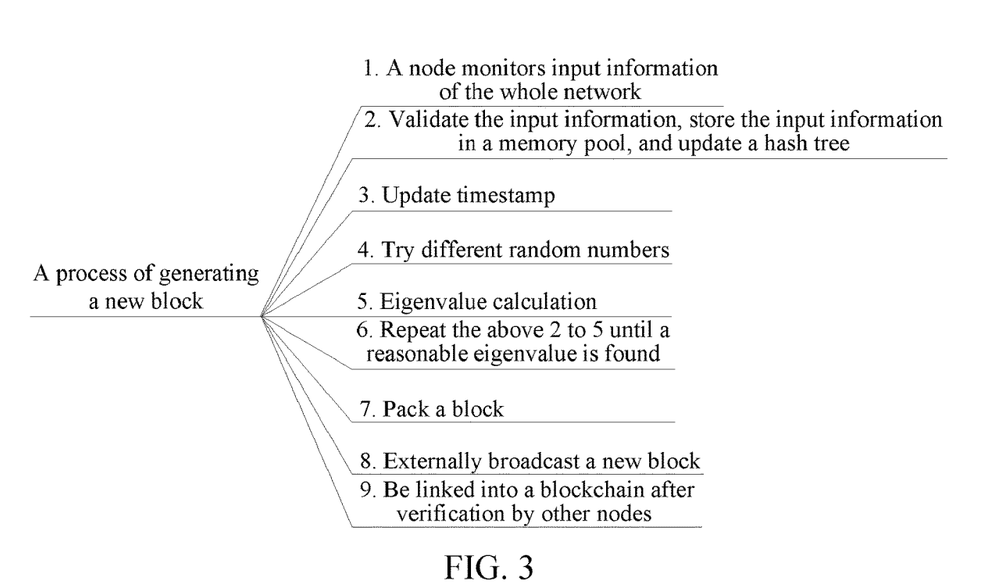
FIG. 3 is a schematic diagram of a process of generating a block.

When blocks are generated in the blockchain, referring to FIG. 3, when a node where the blockchain is located receives the inputted information, the inputted information may be verified. After the verification is completed, the inputted information may be stored in a memory pool, and a hash tree used for recording the inputted information may be updated. Next, the timestamp may be updated to the time when the inputted information is received, different random numbers may be tried, and eigenvalue calculation may be performed a plurality of times, so that the calculated eigenvalue may satisfy the following exemplary formula:

$$SHA256(SHA256(version+prev\_hash+merkle\_root+ntime+nbits+x))<TARGET$$

where, SHA256 is an eigenvalue algorithm used for calculating an eigenvalue; version (a version number) is version information of a related block protocol in the blockchain; prev_hash is the block header eigenvalue of the parent block of the current block; merkle_root is the inputted information eigenvalue; ntime is the update time of updating the timestamp; nbits is current difficulty, is a fixed value within a period of time, and is redetermined after the fixed period of time; x is a random number; and TARGET is an eigenvalue threshold, and the eigenvalue threshold may be determined and obtained according to nbits.

In this way, when a random number satisfying the above formula is obtained through calculation, information may be correspondingly stored, and a block header and a block body are generated, to obtain the current block. Subsequently, for example, the node in which the blockchain is located transmits, according to node identifiers of other nodes in a data sharing system, a newly generated block to the other nodes in the data sharing system in which the node is located, the newly generated block is verified by the other nodes, and after the verification is completed, the newly generated block is added to the blockchain stored in the nodes.

Each node in the blockchain network may be a server, or may be a terminal device. The server may be an independent physical server, or may be a server cluster or a distributed system formed by a plurality of physical servers, or may further be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal device may be a smartphone, a tablet computer, a notebook computer, a desktop computer, a smart speaker, a smart watch, or the like, but is not limited thereto. Each node may be directly or indirectly connected in a wired or wireless communication manner. This is not limited in this disclosure.

The foregoing cloud computing can refer to a delivery and use mode of IT infrastructure, such as obtaining required resources through a network in an on-demand and easy-to-expand manner. Cloud computing in a broad sense is, for example, a delivery and usage mode of services, which is to obtain required services by using a network in an on-demand and easily expandable manner. Such services may be related to the IT, software, and the Internet, or may be other services. Cloud computing is grid computing (Grid Computing), distributed computing (Distributed Computing), parallel computing (Parallel Computing), utility computing (Utility Computing), network storage (Network Storage Technologies), virtualization (Virtualization), load balancing (Load Balance) and other traditional computer and network technology development and integration products. Cloud computing grows rapidly with development of Internet, real-time data streaming, diversity of connection devices, and demands for searching service, social network, mobile commerce, and open collaboration. Different from parallel distributed computing in the past, emergence of cloud computing will promote revolutionary changes in an entire Internet model and enterprise management model.

After the blockchain network reaches a consensus on the block, the blockchain node needs to write the block information into the ledger. The block information includes a block and a block execution result. The block includes a block header and a transaction list, and the block execution result includes a transaction execution result set and a write set.

Typically, a node accounting method serially writes the block information to a disk or a distributed storage. For example, the block header is first written into a disk or a distributed storage, and the transaction list and the transaction execution result set continue to be written into the disk or the distributed storage after this step is completed. After the transaction list and the transaction execution result set are written, the write set is written into the disk or the distributed storage. After the write set is written, the node accounting is completed and a next round of consensus block generation begins. However, the scheme of block accounting adopts a serial method as a whole, and the performance is heavily dependent on I/O resources, resulting in a larger accounting delay in each round of blocks.

Based on this, embodiments of this disclosure include a new asynchronous accounting solution for the blockchain. Exemplary implementation details of technical solutions of the embodiments of this disclosure are described in further detail below.

Figure 4:
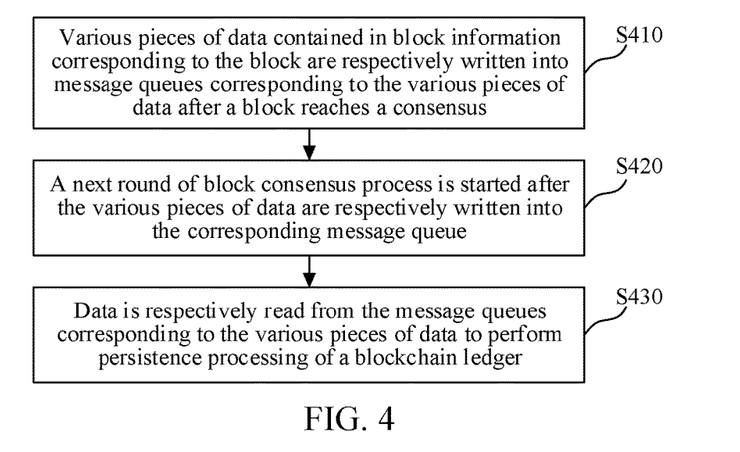
FIG. 4 is a flowchart of an asynchronous accounting method for a blockchain according to an embodiment of this disclosure.

FIG. 4 is a flowchart of an asynchronous accounting method for a blockchain according to an embodiment of this disclosure. The asynchronous accounting method for a blockchain may be performed by any consensus node in the blockchain network. Referring to FIG. 4, the asynchronous accounting method for a blockchain may include at least S410 to S430. A detailed description is as follows:

In S410, various pieces of data contained in block information corresponding to the block are respectively written into message queues corresponding to the various pieces of data after a block reaches a consensus. In an example, after a block reaches a consensus, different types of data contained in block information of the block are written into message queues corresponding to the respective types of data. Each of the message queues may correspond to a different one of the types of data contained in the block information.

In an embodiment of this disclosure, a message queue may be set for the various pieces of data contained in the block information, and the message queue is used for storing the data that needs to be persistently processed.

In addition, in a possible implementation, a cache may further be set for various pieces of data. The function of the cache is to respond to a service request through the data stored in the cache before completing the persistence processing of the block information, such as responding to a query request through the data stored in the cache.

In an embodiment of this disclosure, the various pieces of data contained in the block information may include: a block header, transaction data and a write set. The block header stores header information of the block, containing a hash value (prehash) of a previous block, a hash value (hash) of a current block, a timestamp and so on. The transaction data includes a transaction information list and a transaction execution result message. The write set contains a value pre-written to the variable by an endorsement node in the process of pre-executing the transaction, that is, the write to the variable is only recorded in the write set and does not change a world state, and the write set is also recorded in a form of a key-value pair.

Based on the various pieces of data contained in the block information in the foregoing embodiments, the block header may be written into a queue and a cache corresponding to the block header, the transaction data may be written into a queue and a cache corresponding to the transaction data, and the write set may be written into a queue and a cache corresponding to the write set.

In an embodiment of this disclosure, the block header contained in the block information may be written into the cache corresponding to the block header by using block height as a keyword and block header data as a value.

In an embodiment of this disclosure, the transaction data contained in the block information may be written into the cache corresponding to the transaction data by using transaction hash as a keyword and transaction data as a value.

In an embodiment of this disclosure, the write set contained in the block information may be written into the cache corresponding to the write set by using table name and index as keywords and write data as a value.

Still referring to FIG. 4, in S420, a next round of block consensus process is started after the various pieces of data are respectively written into the corresponding message queue. In an example, a next round of block consensus processing starts after the different types of data are written into the message queues corresponding to the respective types of data.

In an embodiment of this disclosure, after the various pieces of data contained in the block information are respectively written into the corresponding message queue, or after the various pieces of data contained in the block information are respectively written into the corresponding message queue and cache, each consensus node in the blockchain network can start a next round of block consensus process without waiting for the block information to be persistently processed before starting the next round of consensus process, which effectively improves the consensus performance of the blockchain network.

Still referring to FIG. 4, in S430, data is respectively read from the message queues corresponding to the various pieces of data to perform persistence processing of a blockchain ledger. In an example, the different types of data are read from the message queues corresponding to the respective types of data to perform persistence processing of a blockchain ledger. The difference types of data may be read by processing circuitry for example.

In an embodiment of this disclosure, the message queues corresponding to the various pieces of data may be monitored, and a target message queue is a message queue in the message queues corresponding to the various pieces of data. If it is monitored that the target message queue contains data, the data is sequentially read from the target message queue for persistence processing. The target message queue is a message queue containing data in the message queues corresponding to the various pieces of data in the block information. In an example, a monitoring task for the message queues may be started, and then the message queues corresponding to the various pieces of data are monitored through the monitoring task for the message queues.

In an embodiment of this disclosure, a process of sequentially reading the data from the target message queue for persistence processing may be calling a storage layer interface to perform the persistence processing on the data sequentially read from the target message queue. If the persistence processing fails, recall the storage layer interface to perform the persistence processing on the data read from the target message queue until the persistence processing succeeds.

In an embodiment of this disclosure, the various pieces of data corresponding to the target block may be deleted from the cache after the persistence processing is performed on the various pieces of data corresponding to the target block. A technical solution of this embodiment can ensure that the cache is cleaned up in time after the various pieces of data corresponding to the block is persistently processed, to release storage space of the cache.

Based on a technical solution of the embodiment shown in FIG. 4, in an embodiment of this disclosure, after the block reaches the consensus, a consensus block and a corresponding block execution result can be first written into the log. For a target block contained in the log, the target block and a block execution result of the target block can be deleted from the log after the persistence processing is performed on various pieces of data corresponding to the target block. A technical solution of this embodiment makes it possible to temporarily store the consensus block and the corresponding block execution result through the log, thereby enabling the blockchain node to determine whether there is block information that has not been persistently processed based on the log, and ensuring that the block height maintained by each blockchain node are consistent.

In an embodiment of this disclosure, based on the log in the foregoing embodiment, after restarting the blockchain node, a block and a block execution result contained in the log can be obtained, and then the persistence processing is performed according to the block and the block execution result obtained from the log. A technical solution of this embodiment enables the blockchain node to ensure the integrity of the stored block information based on reading the log after being restarted.

In an embodiment of this disclosure, after the block in the blockchain network reaches the consensus, a consensus block and a corresponding block execution result can be first written into the log, and after the log is written successfully, various pieces of data contained in block information corresponding to the consensus block are respectively written into message queues corresponding to the various pieces of data, or also into a cache. That is, in this embodiment, the priority of writing the log is higher, and only after the log is successfully written, the various pieces of data contained in the block information are respectively written into the message queues corresponding to the various pieces of data, or also into the cache. In addition, in an embodiment of this disclosure, in a case that writing the consensus block and the corresponding block execution result into the log fails, perform retry processing. When the log has still not been successfully written after the number of retries reaches set number of times, stop performing accounting and transmit an alert notification message.

In an embodiment of this disclosure, after the block in the blockchain network reaches the consensus, the process of writing the consensus block and the corresponding block execution result into the log and the process of respectively writing the various pieces of data contained in the block information corresponding to the consensus block into the message queue and the cache corresponding to the various pieces of data may also be carried out simultaneously; or may also be first written into the message queue and the cache, and then into the log. After the writing fails, retry can be performed, and when the number of retries reaches the threshold, an alarm notification processing is performed.

Exemplary implementation details of this disclosure are described in detail below in a specific embodiment.

In an embodiment of this disclosure, a log management component may be set. The log management component is mainly used for preventing the ledger data from being inconsistent with the data of other nodes when the node performs re-accounting after being restarted. For example, the log management component will save several latest consensus blocks and block execution results. After the node is restarted, the ledger module will first read the blocks and the block execution results in the log management component, and then rewrite the read data into a disk or a distributed storage to ensure the completeness of the node data and the consistency of the data state with other nodes at the same block height. In addition, the blocks and the block execution results stored in the log management component will be deleted. For example, after the node performs the persistence processing on relevant data of a certain block, the persistently processed blocks and the block execution results can be deleted from the log management component.

In an embodiment of this disclosure, three different queue component may be set. One queue is a block queue, which is used for storing block header data; one queue is a transaction queue, which is used for storing transaction data (e.g., a transaction information list and a transaction execution result); and one queue is a writeset queue, which is used for storing write set. In addition, three tasks are introduced. One task is a persist block job, which is used for monitoring whether block queue has block header data written in real time; one task is a persist transaction job, which is used for monitoring whether transaction queue has transaction data written in real time; and one task is a persist writeset job, which is used for monitoring whether writeset queue has write set written in real time.

In an embodiment of this disclosure, a cache management component may further be introduced. The cache management component respectively caches and clears the block header data in a block cache, the transaction data in a transaction cache, and the write set data in a writeset cache. The block cache uses block height as a keyword and block header data as a value to cache. The transaction cache uses transaction hash as a keyword and transaction data as a value to cache. The writeset cache uses table name and index as keywords and write data as a value to cache.

In an embodiment of this disclosure, when the ledger module is called to write new block data, the block and the block execution result are first written into the log management component. If writing into the log management component fails, the ledger module decides whether to retry based on the reason for the failure. When the number of retries reaches a certain number of times, accounting of the block will be terminated, and the relevant maintenance personnel will be notified to check and repair.

In an embodiment of this disclosure, after the ledger module writes the block data into the log management component, concurrent execution logic will be used to respectively write the block header, the transaction data (e.g., the transaction information list and the transaction execution result), and the write set into operations at the same time. Specific writing operations are as follows. When writing the block header data, a block header message will be generated and written into the block queue according to specifications of the block queue (e.g., a format requirement), and then written into the cache according to a requirement of the cache management component block cache. Similarly, when writing the transaction data, a transaction list message is generated and written into the transaction queue according to specifications of the transaction queue, and then written into the cache according to a requirement of the transaction cache. Similarly, the write set is written into the writeset queue according to specifications of the writeset queue, and then the write set is written into the writeset cache. When the foregoing three types of data are respectively written into the queue and the cache, it can be considered that the accounting is over, and a next round of block consensus process can be started at this time. The foregoing three types of data are written concurrently, and an accounting delay is subject to the writing delay of a certain type of data, which greatly reduces the accounting delay.

To persist the ledger data, the foregoing three real-time tasks respectively monitor the three queues. The persist block job monitors whether the block queue has a block header message that needs to be written into a storage, the persist transaction job monitors whether the transaction queue has transaction data that needs to be written into the storage, and the persist writeset job monitors whether the writeset queue has write set data that needs to be written into the storage.

If the persist block job task monitors that the block queue has block header data that needs to be written into the storage, the block header data is sequentially read from the block queue. Since the block header data is put into the block queue in an order of the block height, the block header data read by this task is also in an order of the block height, and no additional sorting is required. After the task reads the block header data, a storage layer interface is called to persist the block data. Similarly, if the persist transaction job task monitors that the transaction queue has transaction data that needs to be written into the storage, the transaction data is sequentially read from the transaction queue. After the task reads the transaction data, a storage layer interface is called to persist the block data. If the persist writeset job monitors that the writeset queue has write set data that needs to be written into the storage, the write set data is sequentially read from the writeset queue. After the task reads the write set data, a storage layer interface is called to persist the block data.

To persist the data, the foregoing three tasks need to ensure that the process of calling the storage layer persistence returns correctly. If the persistence attempt fails, the storage layer interface is called to retry, and the retry process can ensure the idempotency of the data. No matter how many attempts are made, the stored data is consistent with the data after the first persistence.

In an embodiment of this disclosure, as described above, after relevant data of a certain block is persistently processed, the persistent block and the block execution result can be deleted from the log management component, and then the data stored in the log management component can be cleaned up in time. In addition, after relevant data of a certain block is persistently processed, various pieces of data corresponding to the block that has been persistently processed can be deleted from the cache, and the block header data in the block cache, the transaction data in the transaction cache and the write set data in the writeset cache can be cleaned up in time.

Technical solutions of the embodiments of this disclosure reduce the accounting delay of the block by processing the various pieces of data contained in the block information in parallel. On the other hand, a next round of block consensus process can be started after the data is written into the message queue and the cache without waiting for the persistence process of the various pieces of data in the block, realizing the process of asynchronous accounting and improving the throughput of the blockchain network, thereby effectively improving the processing performance of the blockchain network.

The following describes an apparatus embodiment of this disclosure, which may be configured to perform the asynchronous accounting method for a blockchain in the foregoing embodiment of this disclosure. For details not disclosed in the apparatus embodiment of this disclosure, reference may be made to the foregoing embodiments of the asynchronous accounting method for a blockchain of this disclosure.

Figure 5:
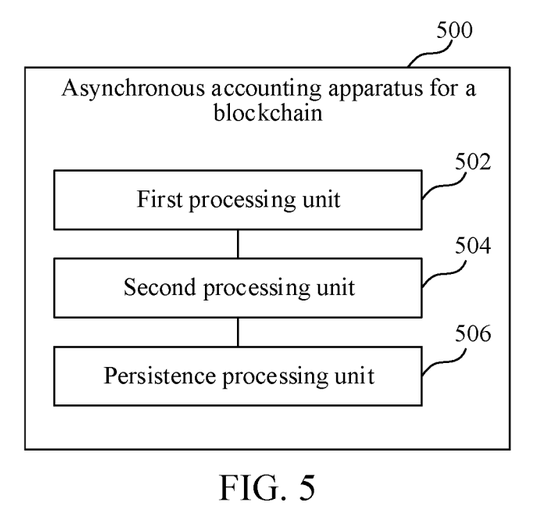
FIG. 5 is a block diagram of an asynchronous accounting apparatus for a blockchain according to an embodiment of this disclosure.

FIG. 5 is a block diagram of an asynchronous accounting apparatus for a blockchain according to an embodiment of this disclosure. The asynchronous accounting apparatus for a blockchain may be set in any consensus node in the blockchain network. One or more modules, submodules, and/or units of the apparatus can be implemented by processing circuitry, software, or a combination thereof, for example.

Referring to FIG. 5, an asynchronous accounting apparatus 500 for a blockchain according to an embodiment of this disclosure includes: a first processing unit 502, a second processing unit 504 and a persistence processing unit 506.

The first processing unit 502 is configured to respectively write, after a block reaches a consensus, various pieces of data contained in block information corresponding to the block into message queues corresponding to the various pieces of data. The second processing unit 504 is configured to start a next round of block consensus process after the various pieces of data are respectively written into the corresponding message queues. The persistence processing unit 506 is configured to respectively read data from the message queues corresponding to the various pieces of data to perform persistence processing of a blockchain ledger.

In some embodiments of this disclosure, based on the foregoing solutions, the first processing unit is further configured to: respectively write the various pieces of data contained in the block information corresponding to the block into the message queues and caches corresponding to the various pieces of data.

In some embodiments of this disclosure, based on the foregoing solutions, the first processing unit 502 is further configured to: write the block and a corresponding block execution result into a log after the block reaches the consensus; and for a target block contained in the log, delete the target block and a block execution result of the target block from the log after the persistence processing is performed on various pieces of data corresponding to the target block.

In some embodiments of this disclosure, based on the foregoing solutions, the first processing unit 502 is further configured to: obtain a block and a block execution result contained in the log after a blockchain node is restarted; and perform persistence processing according to the block and the block execution result obtained from the log.

In some embodiments of this disclosure, based on the foregoing solutions, the first processing unit 502 is configured to: respectively write the various pieces of data contained in the block information corresponding to the block into the message queues corresponding to the various pieces of data after successfully writing the block and the corresponding block execution result into the log.

In some embodiments of this disclosure, based on the foregoing solutions, the first processing unit 502 is further configured to: perform retry processing in a case that writing the block and the corresponding block execution result into the log fails, and stop performing accounting on the block and transmit an alert notification message when the log has still not been successfully written after the number of retries reaches set number of times.

In some embodiments of this disclosure, based on the foregoing solutions, the second processing unit 504 is further configured to: delete the various pieces of data corresponding to the target block from the cache after the persistence processing is performed on the various pieces of data corresponding to the target block.

In some embodiments of this disclosure, based on the foregoing solutions, the first processing unit 502 is configured to: write a block header contained in the block information into a queue and a cache corresponding to the block header, write transaction data contained in the block information into a queue and a cache corresponding to the transaction data, write a write set contained in the block information into a queue and a cache corresponding to the write set, where the transaction data includes a transaction information list and a transaction execution result.

In some embodiments of this disclosure, based on the foregoing solutions, various pieces of data included in the block information includes: a block header, transaction data and a write set. The first processing unit 502 is configured to: using block height as a keyword and block header data as a value, and writing the block header contained in the block information into a cache corresponding to the block header; use transaction hash as a keyword and transaction data as a value, and write transaction data contained in the block information into a cache corresponding to the transaction data; and use table name and index as keywords and write data as a value, and write a write set contained in the block information into a cache corresponding to the write set.

In some embodiments of this disclosure, based on the foregoing solutions, the persistence processing unit 506 is configured to: monitor the message queues corresponding to the various pieces of data, a target message queue being a message queue in the message queues corresponding to the various pieces of data; and sequentially read the data from the target message queue for persistence processing in a case that it is monitored that the target message queue contains data.

In some embodiments of this disclosure, based on the foregoing solutions, the persistence processing unit 506 is configured to: call a storage layer interface to perform the persistence processing on the data sequentially read from the target message queue; and in a case that the persistence processing fails, recall the storage layer interface to perform the persistence processing on the data read from the target message queue until the persistence processing succeeds.

In some embodiments of this disclosure, based on the foregoing solutions, the persistence processing unit 506 is configured to: start a monitoring task for the message queues; and monitor the message queues corresponding to the various pieces of data through the monitoring task for the message queues.

In some embodiments of this disclosure, based on the foregoing solutions, the second processing unit 504 is further configured to: respond to a service request through data stored in the cache before the persistence processing on the block information is completed.

Figure 6:
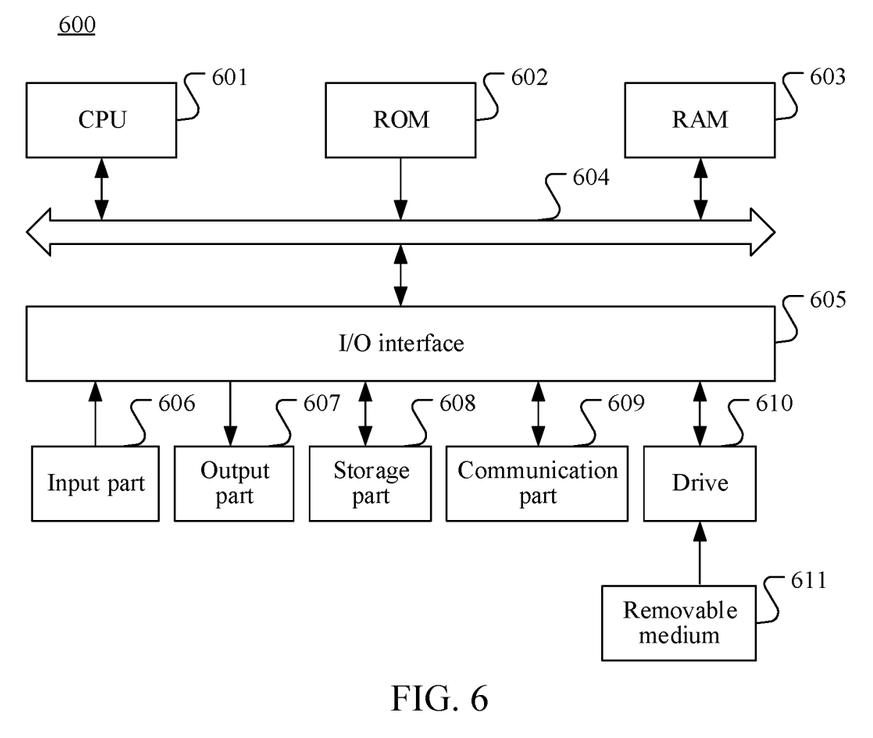
FIG. 6 is a schematic structural diagram of a computer system adapted to implement an electronic device according to an embodiment of this disclosure.

FIG. 6 is a schematic structural diagram of a computer system adapted to implement an electronic device according to an embodiment of this disclosure.

The computer system 600 of the electronic device shown in FIG. 6 is merely an example, and does not constitute any limitation on functions and use ranges of the embodiments of this disclosure.

As shown in FIG. 6, the computer system 600 includes processing circuitry, such as a central processing unit (CPU) 601, which can execute various appropriate actions and processing according to a program stored in a read-only memory (ROM) 602 or a program loaded from a storage part 608 to a random access memory (RAM) 603, such as performing the methods described in the foregoing embodiments. The RAM 603 further stores various programs and data required for operating the system. The CPU 601, the ROM 602, and the RAM 603 are connected to each other through a bus 604. An input/output (I/O) interface 605 is also connected to the bus 604.

The following components are connected to the I/O interface 605: an input part 606 including a keyboard and a mouse, etc.; an output part 607 including a cathode ray tube (CRT), a liquid crystal display (LCD), a speaker, or the like; a storage part 608 including hard disk, or the like; and a communication part 609 including a network interface card such as a local area network (LAN) card, a modem, or the like. The communication part 609 performs communication processing by using a network such as the Internet. A drive 610 is also connected to the I/O interface 605 as required. A removable medium 611, such as a disk, an optical disc, a magneto-optical disc, or a semiconductor memory, is installed on the drive 610 as required, so that a computer program read from the removable medium 611 is installed in the storage part 608 as required.

According to an embodiment of this disclosure, the processes described above by referring to the flowcharts may be implemented as computer software programs. For example, an embodiment of this disclosure includes a computer program product. The computer program product includes a computer program stored in a computer-readable medium. The computer program includes a computer program used for performing a method shown in the flowchart. In such an embodiment, the computer program may be downloaded and installed through the communication part 609 from a network, and/or installed from the removable medium 611. When the computer program is executed by the CPU 601, the various functions defined in the system of this disclosure are executed.

The computer-readable medium shown in the embodiments of this disclosure may be a computer-readable signal medium or a computer-readable storage medium or any combination of two. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this disclosure, the computer-readable storage medium (e.g., a non-transitory computer-readable storage medium) may be any tangible medium containing or storing a program, and the program may be used by or used in combination with an instruction execution system, an apparatus, or a device. In this disclosure, a computer-readable signal medium may include a data signal in a baseband or propagated as a part of a carrier wave, the data signal carrying a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may transmit, propagate, or transmit a program that is used by or used in combination with an instruction execution system, apparatus, or device. The computer program included in the computer-readable storage medium may be transmitted using any suitable medium, including but not limited to: a wireless medium, a wired medium, or any suitable combination thereof.

The flowcharts and block diagrams in the accompanying drawings illustrate possible system architectures, functions, and operations that may be implemented by a system, a method, and a computer program product according to various embodiments of this disclosure. Each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of this disclosure may be implemented in a software manner, or may be implemented in a hardware manner, and the unit described may further be set in a processor. Names of the units do not constitute a limitation on the units in a specific case.

In another aspect, this disclosure further provides a computer readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this disclosure, the features and functions of two or more modules or units described above may be specifically implemented in one module or unit. Conversely, features and functions of one module or unit described above may be further divided into a plurality of modules or units for implementation.

Through the descriptions of the foregoing implementations, a person skilled in the art easily understands that the exemplary implementations described herein may be implemented through software, or may be implemented through software located in combination with necessary hardware. Therefore, technical solutions of the embodiments of this disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this disclosure.

This disclosure is intended to cover other implementations including any variations, uses or adaptive changes of this disclosure. Such variations, uses or adaptive changes follow the general principles of this disclosure.

It is to be understood that this disclosure is not limited to the precise structures described above and shown in the accompanying drawings, and various modifications and changes can be made without departing from the scope of this disclosure. Other embodiments are within the scope of this disclosure.

What is claimed is:

1. An asynchronous accounting method for a blockchain, the asynchronous accounting method comprising:
    writing, after a block reaches a consensus, each of a block header, transaction data, and a write set contained in block information of the block into a corresponding one of a plurality of message queues and caches of the block, wherein
        the block header contained in the block information is written into a first queue and a first cache corresponding to the block header;
        the transaction data contained in the block information is written into a second queue and a second cache corresponding to the transaction data, the transaction data including a transaction information list and a transaction execution result; and
        the write set contained in the block information is written into a third queue and a third cache corresponding to the write set;
    starting a next round of block consensus processing after the block header, the transaction data, and the write set are written into the message queues and caches of the block; and
    reading, by processing circuitry, the block header, the transaction data, and the write set of the block from the message queues to perform persistence processing of a blockchain ledger by concurrently writing the block header, the transaction data, and the write set of the block read from the message queues into storage.

2. The asynchronous accounting method according to claim 1, wherein
    the write set is generated based on a pre-execution of a transaction corresponding to the transaction data.

3. The asynchronous accounting method according to claim 1, further comprising:
    writing the block and a corresponding block execution result into a log after the block reaches the consensus; and
    for a target block contained in the log, deleting the target block and a block execution result of the target block from the log after the persistence processing is performed on the block header, the transaction data, and the write set of the target block.

4. The asynchronous accounting method according to claim 3, further comprising:
    obtaining a block and a block execution result contained in the log after a blockchain node is restarted; and
    performing the persistence processing according to the block and the block execution result obtained from the log.

5. The asynchronous accounting method according to claim 3, wherein the writing the each of the block header, the transaction data, and the write set contained in the block information comprises:
    writing the block header, the transaction data, and the write set contained in the block information of the block into the message queues and caches after successfully writing the block and the corresponding block execution result into the log.

6. The asynchronous accounting method according to claim 5, further comprising:
    performing retry processing based on a failure to write the block and the corresponding block execution result into the log, and
    stopping performing of accounting on the block and transmitting an alert notification message based on the block and the corresponding block execution result not being successfully written into the log after a number of retries reaches a set number of times.

7. The asynchronous accounting method according to claim 1, further comprising:
    deleting the block header, the transaction data, and the write set of a target block from the caches after the persistence processing is performed on the block header, the transaction data, and the write set of the target block.

8. The asynchronous accounting method according to claim 1, wherein
    the writing the each of the block header, the transaction data, and the write set comprises:

using block height as a keyword and block header data as a value, and writing the block header contained in the block information into the first cache corresponding to the block header;

using transaction hash as a keyword and the transaction data as a value, and writing the transaction data contained in the block information into the second cache corresponding to the transaction data; and using table name and index as keywords and write data as a value, and writing the write set contained in the block information into the third cache corresponding to the write set.

9. The asynchronous accounting method according to claim 1, wherein the reading comprises:

monitoring the message queues of the block header, the transaction data, and the write set, a target message queue is one of the first queues, the second queues, and the third queues; and sequentially reading, based on the target message queue containing data, the data from the target message queue for the persistence processing.

10. The asynchronous accounting method according to claim 9, wherein the sequentially reading comprises:

calling a storage layer interface to perform the persistence processing on the data sequentially read from the target message queue; and based on a failure of the persistence processing, recalling the storage layer interface to perform the persistence processing on the data read from the target message queue until the persistence processing succeeds.

11. The asynchronous accounting method according to claim 9, wherein the monitoring comprises:

starting a monitoring task for the message queues; and monitoring the message queues of the block header, the transaction data, and the write set through the monitoring task for the message queues.

12. The asynchronous accounting method according to claim 1, further comprising:

responding to a service request through the data stored in the caches before the persistence processing on the block information is completed.

13. An asynchronous accounting apparatus, comprising:
processing circuitry configured to:

write, after a block reaches a consensus, each of a block header, transaction data, and a write set contained in block information of the block into a corresponding one of a plurality of message queues and caches of the block, wherein the block header contained in the block information is written into a first queue and a first cache corresponding to the block header;

the transaction data contained in the block information is written into a second queue and a second cache corresponding to the transaction data, the transaction data including a transaction information list and a transaction execution result; and the write set contained in the block information is written into a third queue and a third cache corresponding to the write set;

start a next round of block consensus processing after the block header, the transaction data, and the write set are written into the message queues and caches of the block; and read the block header, the transaction data, and the write set of the block from the message queues to perform persistence processing of a blockchain ledger by concurrently writing the block header, the transaction data, and the write set of the block read from the message queues into storage.

14. The asynchronous accounting apparatus according to claim 13, wherein the write set is generated based on a pre-execution of a transaction corresponding to the transaction data.

15. A non-transitory computer-readable storage medium, storing instructions which when executed by a processor cause the processor to perform:

writing, after a block reaches a consensus, each of a block header, transaction data, and a write set contained in block information of the block into a corresponding one of a plurality of message queues and caches of the block, wherein the block header contained in the block information is written into a first queue and a first cache corresponding to the block header;

the transaction data contained in the block information is written into a second queue and a second cache corresponding to the transaction data, the transaction data including a transaction information list and a transaction execution result; and the write set contained in the block information is written into a third queue and a third cache corresponding to the write set;

starting a next round of block consensus processing after the block header, the transaction data, and the write set are written into the message queues and caches of the block; and reading, by processing circuitry, the block header, the transaction data, and the write set of the block from the message queues to perform persistence processing of a blockchain ledger by concurrently writing the block header, the transaction data, and the write set of the block read from the message queues into storage.

* * * * *

UNITED STATES PATENT AND TRADEMARK OFFICE
CERTIFICATE OF CORRECTION

| | | |
|---|---|---|
| PATENT NO. | : 12,105,735 B2 | Page 1 of 1 |
| APPLICATION NO. | : 17/974233 | |
| DATED | : October 1, 2024 | |
| INVENTOR(S) | : Pan Liu | |

It is certified that error appears in the above-identified patent and that said Letters Patent is hereby corrected as shown below:

On the Title Page

Item (71), the Applicant city reads as:
Guangdong (CN)

Should read as:
--Shenzhen (CN)--

Signed and Sealed this
Thirty-first Day of December, 2024

Derrick Brent
*Acting Director of the United States Patent and Trademark Office*